(12) United States Patent
Moore

(10) Patent No.: US 10,318,198 B2
(45) Date of Patent: Jun. 11, 2019

(54) OPTIMIZABLE HEAP FOR EMBEDDED AND SIMILAR SYSTEMS WITH ENHANCED DEBUGGING AND SELF-HEALING

(71) Applicant: Ralph Crittenden Moore, Costa Mesa, CA (US)

(72) Inventor: Ralph Crittenden Moore, Costa Mesa, CA (US)

(*) Notice: Subject to any disclaimer, the term of this patent is extended or adjusted under 35 U.S.C. 154(b) by 123 days.

(21) Appl. No.: 15/441,065

(22) Filed: Feb. 23, 2017

(65) Prior Publication Data
US 2018/0239550 A1 Aug. 23, 2018

(51) Int. Cl.
| | | |
|---|---|---|
| *G06F 12/00* | (2006.01) |
| *G06F 13/00* | (2006.01) |
| *G06F 13/28* | (2006.01) |
| *G06F 3/06* | (2006.01) |
| *G06F 12/0802* | (2016.01) |
| *G06F 11/36* | (2006.01) |
| *G06F 12/02* | (2006.01) |
| *G06F 9/30* | (2018.01) |

(52) U.S. Cl.
CPC .......... *G06F 3/0631* (2013.01); *G06F 3/0604* (2013.01); *G06F 3/0632* (2013.01); *G06F 3/0638* (2013.01); *G06F 3/0659* (2013.01); *G06F 3/0683* (2013.01); *G06F 9/30087* (2013.01); *G06F 11/36* (2013.01); *G06F 12/023* (2013.01); *G06F 12/0802* (2013.01); *G06F 2212/1016* (2013.01); *G06F 2212/1032* (2013.01); *G06F 2212/60* (2013.01)

(58) Field of Classification Search
CPC ............. G06F 11/1448; G06F 11/1458; G06F 11/1469; G06F 3/0631; G06F 12/0862; G06F 19/703

USPC .......................................................... 711/118
See application file for complete search history.

(56) References Cited

U.S. PATENT DOCUMENTS

| | | | | |
|---|---|---|---|---|
| 5,577,243 A * | 11/1996 | Sherwood | ............ | G06F 12/023 |
| 5,680,582 A * | 10/1997 | Slayden | ............... | G06F 12/023 |
| | | | | 711/171 |
| 5,784,699 A * | 7/1998 | McMahon | ........... | G06F 12/023 |
| | | | | 711/170 |
| 6,412,053 B2 * | 6/2002 | Bonola | ................. | G06F 12/023 |
| | | | | 711/170 |
| 6,453,403 B1 * | 9/2002 | Czajkowski | ........ | G06F 12/0253 |
| | | | | 707/999.2 |
| 6,594,749 B1 * | 7/2003 | Czajkowski | .......... | G06F 12/023 |
| | | | | 707/999.202 |
| 7,010,555 B2 * | 3/2006 | Blandy | .............. | G06F 12/0269 |
| 7,827,373 B2 * | 11/2010 | Kaakani | ............... | G06F 12/023 |
| | | | | 711/154 |
| 7,962,707 B2 * | 6/2011 | Kaakani | ............. | G06F 12/0269 |
| | | | | 707/813 |
| 9,329,988 B2 * | 5/2016 | Jones | .................... | G06F 12/023 |
| 2004/0139272 A1 * | 7/2004 | Rodriguez-Rivera | ...................... | |
| | | | | G06F 12/0253 |
| | | | | 711/100 |

(Continued)

*Primary Examiner* — Mohamed M Gebril

(57) ABSTRACT

Provides a bin-type heap where bin sizes can be easily customized to the exact requirements of a specific system by means of a bin size array, thus resulting in greater efficiency and better performance. Also provides enhanced debugging support and self-healing. Intended primarily for embedded and similar systems, which require high performance, deterministic operation, efficient memory utilization, high reliability, and which are characterized by limited block size requirements and ample available idle time.

20 Claims, 9 Drawing Sheets

(56) References Cited

U.S. PATENT DOCUMENTS

| | | | |
|---|---|---|---|
| 2006/0190697 A1* | 8/2006 | Grant | G06F 12/023 |
| | | | 711/170 |
| 2008/0282057 A1* | 11/2008 | Layden | G06F 16/289 |
| | | | 711/210 |
| 2008/0301691 A1* | 12/2008 | Mamagkakis | G06F 8/00 |
| | | | 718/104 |
| 2014/0281336 A1* | 9/2014 | Solihin | G06F 12/0223 |
| | | | 711/170 |
| 2018/0239550 A1* | 8/2018 | Moore | G06F 3/0631 |

* cited by examiner

OPTIMIZABLE HEAP FOR EMBEDDED AND SIMILAR SYSTEMS WITH ENHANCED DEBUGGING AND SELF-HEALING

PROGRAM LISTINGS eheap.c is the complete source code for the heap described in this invention eheap.h provides definitions and examples of configuration constant definitions that are necessary to use eheap in an embedded and similar or other environment edemo.c provides some demo code to verify that eheap is properly installed.

eheap.txt provides instructions to create and use a project to run eheap.

BACKGROUND

The following discussion centers on embedded systems because their requirements are well understood. Other less-understood systems may have similar requirements Heaps are well-known structures used in computer systems to provide dynamic memory allocation and deallocation. Due to the simple nature of most embedded systems, until recently, heaps have not been used extensively in them. However, this is changing. Embedded systems are becoming more complex and their need for dynamic memory allocation is increasing.

Embedded systems are characterized by the following requirements:

Deterministic rapid response to events.

Limited resources due to cost and power constraints.

Unattended operation in harsh environments.

Substantial functional variation from one embedded system to the next.

Linear heaps have been used in embedded systems. Linear heap allocation searches start with the first free chunk and proceed linearly until a big-enough chunk is found. This can be very time consuming for even moderate size heaps, which is not compatible with the real-time deterministic requirements of most embedded systems. Hence linear heaps have been used mainly for one-time allocations during initialization and sparingly for dynamic allocations during operation.

Block pools have been frequently used for dynamic allocations in embedded systems. The problem with block pools is that all blocks in a pool are the same size. Hence, covering a large range of block sizes requires a large number of block pools or it requires blocks to often be much larger than the block needed. Either can be very wasteful of memory, which is not compatible with the limited memory in embedded systems. Block pools have been useful for simple embedded systems that require very few block sizes.

The complexity of embedded systems is growing due to the addition of smartphone-like graphical user interfaces, connection to complex networks, including the IoT, connection to more complex peripherals, and generally more powerful features. With this comes the need for greater memory allocation flexibility within the constraints of embedded systems.

Nearly all prior art including patents, articles, and heaps focuses on heaps for general-purpose systems such as servers, PCs, smart phones, tablets, etc. These systems have gigabytes of memory, megabyte caches, and multi-core processors with gigahertz clock rates. The heaps in these systems are typically hundreds of megabytes in size and have tens of thousands to millions of active chunks.

By contrast, embedded systems have 50 kilobytes to a few megabytes of memory, no cache, and single core processors with 50 to 250 kilohertz clock rates. The heaps in embedded systems typically are tens to hundreds of kilobytes in size with hundreds to thousands of active chunks. Thus, there is a two to three orders of magnitude difference between general purpose systems and embedded systems.

Well-known examples of general-purpose heaps are dlmalloc, ptmalloc2 and 3, glibc malloc, tcmalloc, and nedmalloc. The main focus of these heaps is high performance for a very wide range of applications. Although these heaps use bins, the bins are in rigid structures which do not scale down to embedded systems. In addition, all of these heaps rely upon obtaining more memory from the operating system if they run out—a luxury not available in most embedded systems.

Nor do these heaps address the problem of unattended operation in harsh environments because commercial systems are generally attended and operate in protected environments. And since commercial system programmers have no need to work at the system and hardware levels, as do embedded system programmers, these heaps offer little in the way of low-level debug features to trace heap usage problems.

An article written by Paul R Wilson, et al, "Dynamic Storage Allocation: A Survey and Critical Review" published in 1995 provides a good review of heap research up to that time. The basic finding of this survey is that best results are achieved if the allocator is fit to the application. Since embedded applications vary greatly in requirements, this would imply that an embedded heap should be highly customizable. The article has no discussion of embedded system requirements.

U.S. Pat. No. 5,561,786 to Morse titled "Computer Method and System for Allocating and Freeing Memory Utilizing Segmenting and Free Block Lists" Oct. 1, 1996 teaches dividing a heap into $2^n$ segments of equal size, each with a free list of its blocks in size order. A size tree with links to free lists is searched to find a free list, which is then searched to find a best fit block. Unfortunately, this patent is focused on garbage collection rather than the needs of embedded systems.

U.S. Pat. No. 6,832,381 to Mathur, et. al., titled Application Program Interfaces and Structures in a Resource Limited Operating System, Dec. 14, 2004 wherein if an embedded system runs out of heap, an API is provided to request that another user (e.g. a task) release the heap memory it is using. This is not consistent with the need for deterministic operation of embedded systems and does not address the problem of configuring the heap for best performance.

U.S. Pat. No. 8,838,928 to Robin, et. al. titled Memory Management and Method of Allocation Using Free-List Sep. 16, 2014 teaches the use of lists of identifiers where each has an associated chunk size and threshold to limit free list size. However, this patent requires an underlying operating system allocator, is wasteful of memory, and the regions have fixed block sizes similar block pools.

In general, patents issued to date address needs such as garbage collection, use in multi-processor systems, power-of-two allocation, variants of block pools, use of binary trees, per thread heaps using large blocks allocated by the underlying operating system, and other solutions not relevant to embedded systems. In summary, current heap solutions fail to address the needs of embedded systems in three important areas:

1. Customization to requirements of individual embedded systems.

2. Low-level debug support.
3. Self-healing.

SUMMARY OF THE INVENTION

The inventive subject matter provides a heap meeting the needs of embedded and similar systems. It is based upon a bin-type heap, similar to GPOS heaps wherein the bins store free chunks of certain sizes in order to greatly speed up allocations. Unlike GPOS heaps, which have fixed bin structures, this heap allows the sizes of bins to be easily accommodated to the requirements of each system. Because embedded and similar systems typically do not require wide ranges of block sizes, this feature can be exploited to greatly improve overall system performance.

This heap provides the customary main heap functions of malloc( ), calloc( ), realloc( ), and free( ) and additional functions for other purposes. The bins are organized as a small bin array (SBA) and an upper bin array (UBA); a donor chunk feeds chunks to the SBA and a top chunk feeds chunks to the UBA. In addition, free-chunk merging can be turned OFF in order to avoid bin leaks, due to freed chunks being merged with other free chunks and put into upper bins. This improves performance by insuring that lower bins are more likely to be occupied. Merging can be turned back ON to reduce fragmentation, when necessary.

The SBA provides very fast access for small chunks, and the UBA provides somewhat slower access for large chunks. Each bin in the SBA has one chunk size; each bin in the UBA may have a range of chunk sizes from one to many. A small bin has one chunk size; a large bin has more than one chunk size. The size range for each UBA bin is chosen by the programmer. Large bins are sorted during system idle time in order to improve their performance. A bin sort map indicates which bins to sort, and the sort program runs incrementally from idle so important functions do not miss their deadlines.

In addition to inuse and free chunk types, a debug chunk type exists. It contains debug information such as the time of allocation and the allocating task or function i.d., and it permits surrounding the chunk's data block with fences. Fences protect metadata from damage due to data block overflows. This permits operation to continue as well as allowing overflow patterns to be seen in a debugger memory window. Fences can be continuously scanned to detect and report overflows soon after they occur, thus helping to track down this common programming problem and avoiding system crashes.

Creating debug chunks can be turned ON or OFF, while running, to limit them to code under test. This is important in systems with limited memory size and processor power. Inuse and free chunks can be filled with distinctive patterns, while running, to make them more easily identified in a debugger memory window, when the system is stopped. This feature can also be turned ON or OFF, while running, since filling takes time.

The heap implements self-healing by means of incremental scanning during idle time. This is made possible since all chunks have forward and backward links. Forward scanning is done a few chunks at a time, fixing broken links and other fields, if possible. Broken inuse chunk links are fixed via backward scanning. Similar scanning is implemented for bin free lists. Since incremental scanning occurs whenever a system is idle, there is a high probability in embedded and similar systems that broken links and other fields will be found and fixed, or at least reported, before other heap functions encounter them and fail. Thus, system failures due to heap disturbances are reduced, and system reliability is increased. Finally, a method of recovery from allocation failures is included, which permits compensating for disabling free chunk merging.

BRIEF DESCRIPTION OF DRAWINGS

FIG. 2A shows the heap memory of FIG. 1B after some frees with merging on.

DETAILED DESCRIPTION

The following information describes a simple embodiment of the invention sufficient to explain how it works. Other possible embodiments are mentioned, where useful to illustrate the scope of the invention. Drawings are not to scale for the sake of clarity. In the descriptions that follow, the term "heap memory" means the memory from which data is allocated. Heap memory is composed of chunks; each chunk contains a data block and a header. The data block is allocated to a program. The header contains information necessary to manage the chunk and the heap. A chunk with an allocated data block is called an "inuse" chunk. A chunk with a free data block is called a "free" chunk.

Heap services described in this embodiment are task-safe RTOS services. However, other embodiments are possible where the heap services are ordinary functions that might be included in a library for non-RTOS embedded and similar systems. In addition, this embodiment is directed at use in embedded and similar systems. Other embodiments are possible for other types of systems, including applications running under GPOSs.

Heap Configuration

Figure 1A:
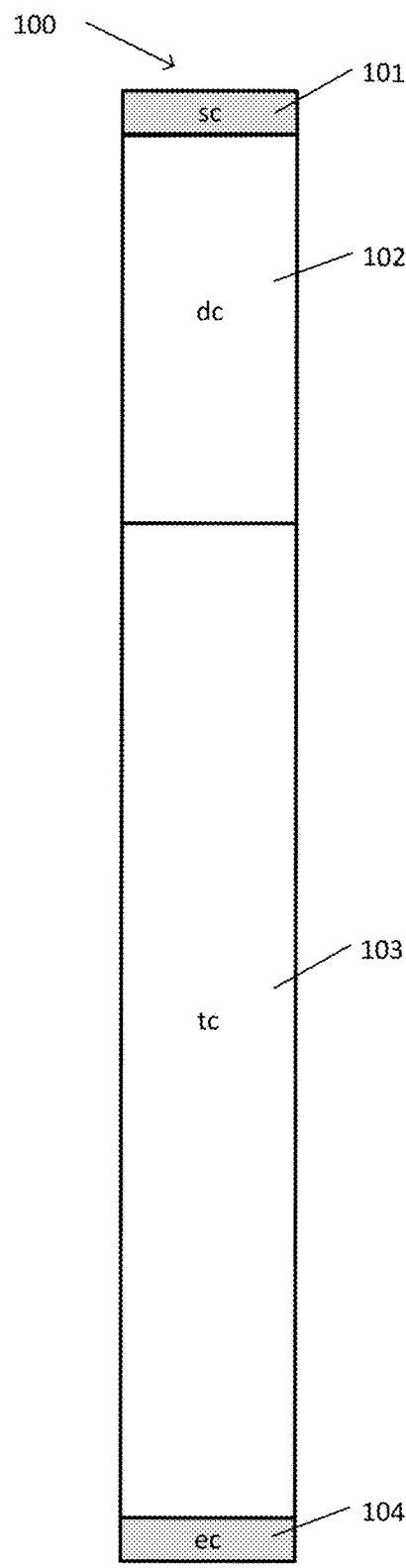
FIG. 1A shows the heap memory immediately after initialization.

FIG. 1A shows the heap memory 100 immediately after heap initialization. Chunk 101 is the start chunk (sc); it is a 16-byte inuse chunk with no data block; it marks the start of the heap memory. Chunk 102 is the optional donor chunk (dc), which contains free memory for allocation of small chunks and should be large enough for the expected number of small chunks. The purpose of dc is to locate allocated small chunks in lower heap memory in order to reduce fragmentation caused by small inuse chunks caught between larger free chunks, thus preventing them from being merged. Chunk 103 is the top chunk (tc); it contains the remainder of free memory. tc is the initial source of free memory for the allocation of all other chunks, including small chunks if dc runs out or is not present. Chunk 104 is the end chunk (ec). It is a 16-byte inuse chunk with no data block and it marks the end of heap memory.

Figure 1B:
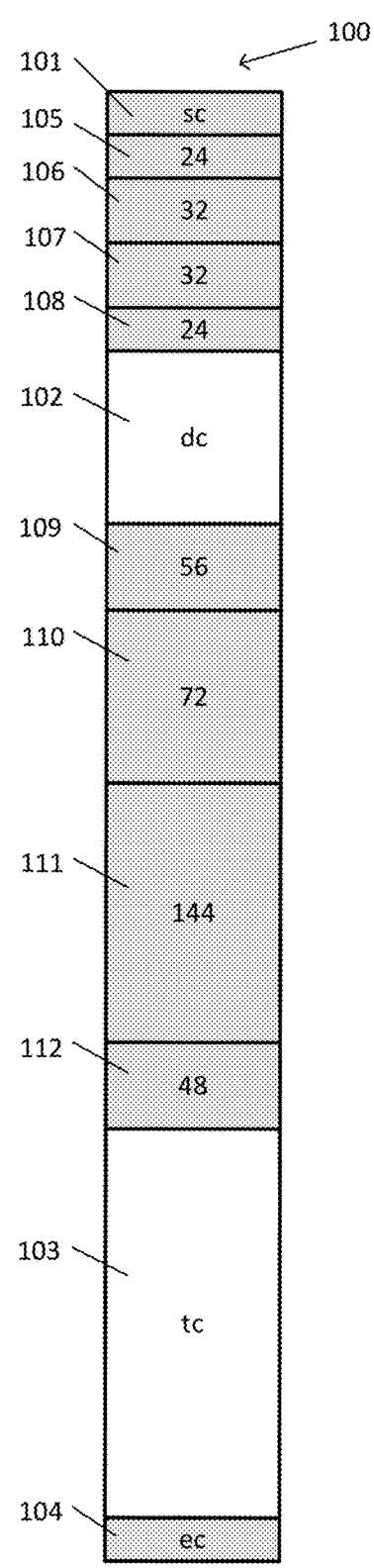
FIG. 1B shows the heap memory after some allocations.

FIG. 1B shows the same heap memory 100 after some allocations. Chunks 105, 106, 107, and 108 are small chunks of sizes 24, 32, 32, and 24 bytes, respectively, that have been allocated (indicated by shading). These have been allocated from dc 102, which is reduced in size by the total size of these chunks. Chunks 109, 110, 111, and 112 are large chunks of sizes 56, 72, 144, and 48 bytes, respectively, that have been allocated. These have been allocated from tc 103, which is reduced by the total size of these chunks. sc 101 and ec 104 are not impacted by allocations.

Figure 2A:
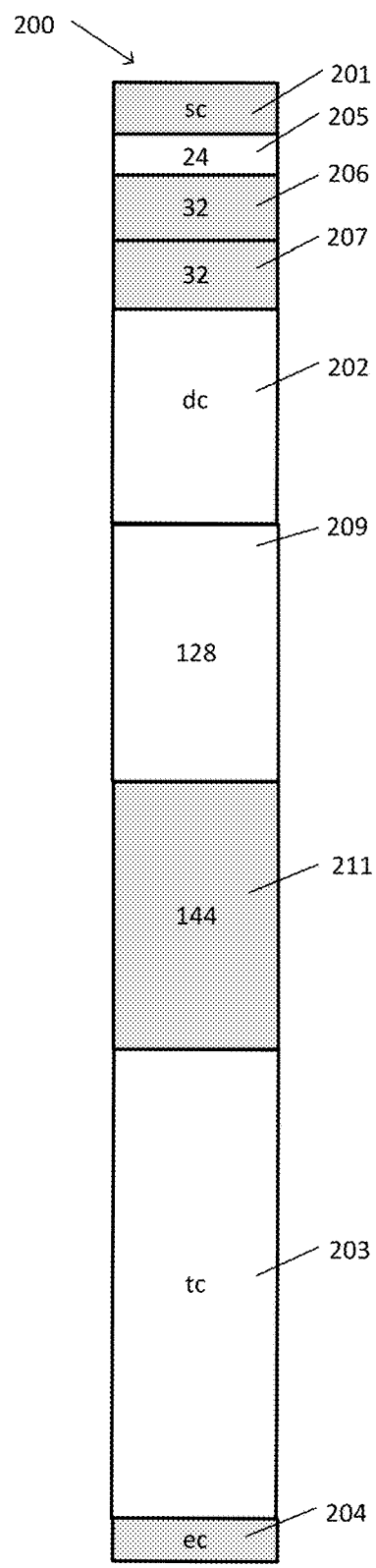

FIG. 2A shows the same heap memory of FIG. 1B after some free operations with free chunk merging enabled. It should be appreciated that allocations and frees are normally randomly interspersed, but here are grouped to enable clearer explanations. Chunk 205 is now free (indicated by no shading); chunks 206 and 207 are still inuse. Chunk 208 has disappeared because it has been merged back into dc 202. Note that dc is correspondingly larger. Merging can only be performed with adjacent chunks, hence chunk 205 has not been merged, but chunks 209 and 210 have been freed and merged resulting in a larger free chunk 209 and no chunk 210. Note that chunk 209 cannot be merged upward into dc. Chunk 211 is still in use; Chunk 212 has disappeared because it has been merged into tc.

Figure 2B:
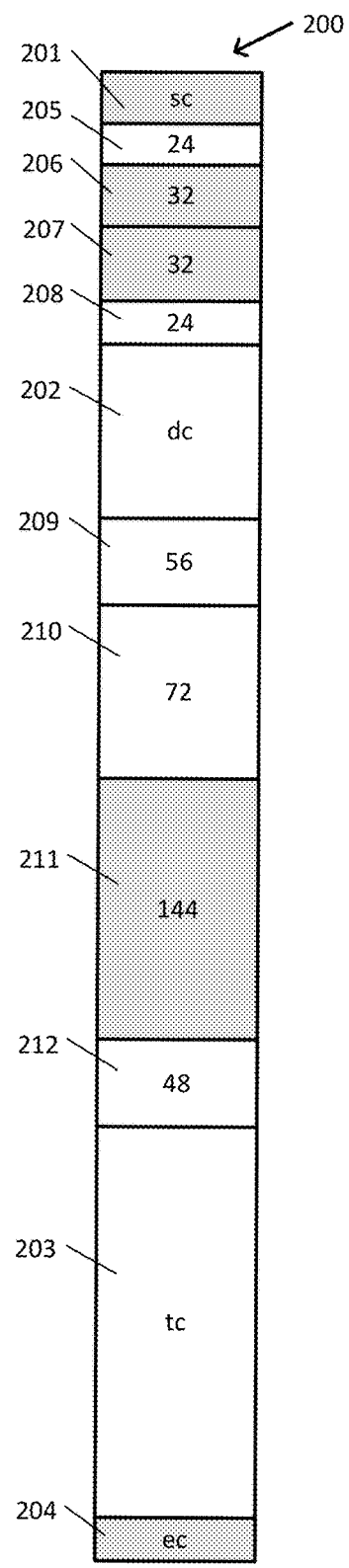
FIG. 2B shows the same frees as FIG. 2A, but with merging off.

FIG. 2B results from the same free operations as FIG. 2A, but with merging disabled. Hence, it has the same chunks as FIG. 1B only some are free and some are inuse.

Bin Size Array and Bins

Bins are said to "hold" chunks. However, this is just a figure of speech. Chunks never actually move out of heap memory—even when allocated. Instead, bins form a logical superstructure over the physical heap memory.

Figure 3A:
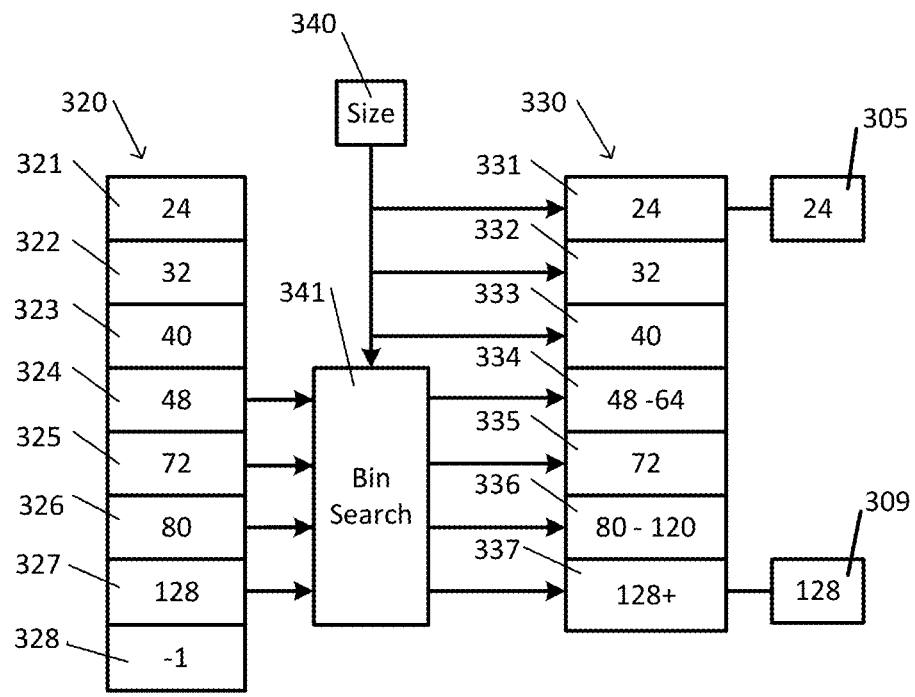
FIG. 3A shows the bin size array and the bins corresponding to FIG. 2A

FIG. 3A shows the bin size array 320, which consists of size entries 321, 322, 323, 324, 325, 326 and 327 containing sizes 24, 32, 40, 48, 72, 80, and 128 bytes, respectively. The bin size array can be located in ROM for safety or in local SRAM for higher performance. The bin array 330 derived from bin size array 320 has corresponding bins 331, 332, 333, 334, 335, 336, and 337, respectively. The sizes in the bin size array are the minimum chunk sizes for the respective bins. The bin array should be in fast RAM. The arrays shown are selected for purposes of illustration. It should be appreciated that different embodiments may have as little as one bin up to that needed by an embedded and similar application—potentially 100 or more bins.

The first bin size in size array 320 must be the minimum chunk size, which is 24 in this embodiment. All chunk sizes must be multiples of 8. Therefore, sizes 24, 32, 40, and 48 in 321, 322, 323, and 324, respectively, are consecutive. This is the criterion to define the Small Bin Array (SBA) consisting of bins 331, 332, and 333, holding chunks sizes 24, 32, and 40, respectively. The SBA has only small bins, and each small bin holds only one chunk size.

The first gap in bin sizes, as shown in entry 325, defines the start of the Upper Bin Array (UBA). Note that entry 325 is 72. Hence, bin 324 is a large bin and it holds chunk sizes 48, 56, and 64. The UBA can have any mixture of large bins and small bins. Note the entry 326 is only 8 above entry 325. Hence bin 335 is a small bin. It is followed by bin 336, which is another large bin, then by bin 337 which is the top bin. All heaps, even one-bin heaps, must have a top bin. It holds chunks of its size and all sizes above.

The last entry in bin size array 320 is an end marker 328 such as −1. New bin sizes can be easily inserted between 321 and 328. Hence the heap can be quickly reconfigured by adding, changing, and removing values in the bin size array 320, recompiling, and restarting the application. Ease of adapting the bin structure to an application is an essential element of the invention.

Figure 3B:
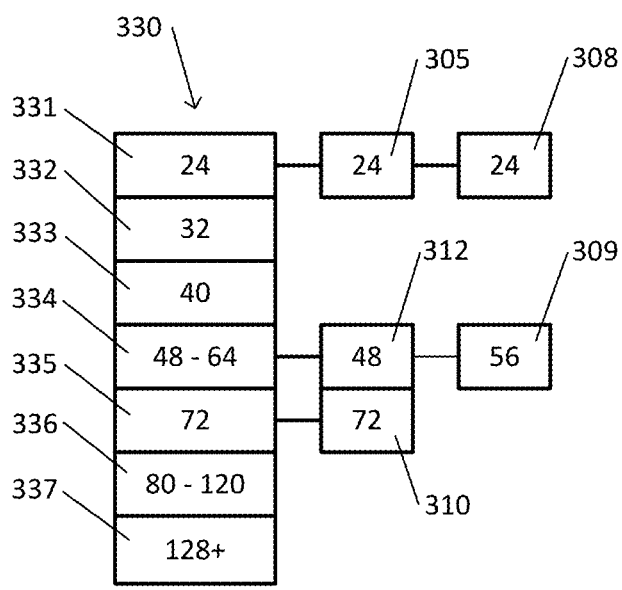
FIG. 3B shows the bins corresponding to FIG. 2B.

FIG. 3A shows bin contents corresponding to FIG. 2A with merging on. Note that only two chunks 305 and 309 have survived in bins. These correspond to chunks 205 and 209 in FIG. 2A. The rest have merged together or back into dc and tc. FIG. 3B shows bin contents corresponding to FIG. 2B with merging off. Note that chunks 305, 308, 309, 310, and 312 are in bins. These correspond to similarly numbered chunks in FIG. 2B. Comparison of FIG. 3A to FIG. 3B shows the dramatic difference that merging can make.

Basic Heap Operations

This particular embodiment of the invention supports the four standard heap services: malloc( ), free( ), calloc( ), and realloc( ). For brevity, only the first two are discussed, because the second two are derived from the first two and add nothing new.

Finding the correct SBA bin (bins 331, 332, or 333) for a heap operation is very quick because a simple formula determines the bin address from chunk size 340. This is shown by direct lines to bins 331, 332, and 333 in FIG. 3A. For the UBA (bins 334, 335, 336, or 337), the bin address is determined by a fast search 341 of chunk size 340 vs. the sizes in the bin size array 320. If a binary search is used, one out of 32 bins can be selected in 5 tries. Since array 320 is in fast memory, this can be accomplished quickly, even though bin sizes are not uniformly spaced.

Figure 4:
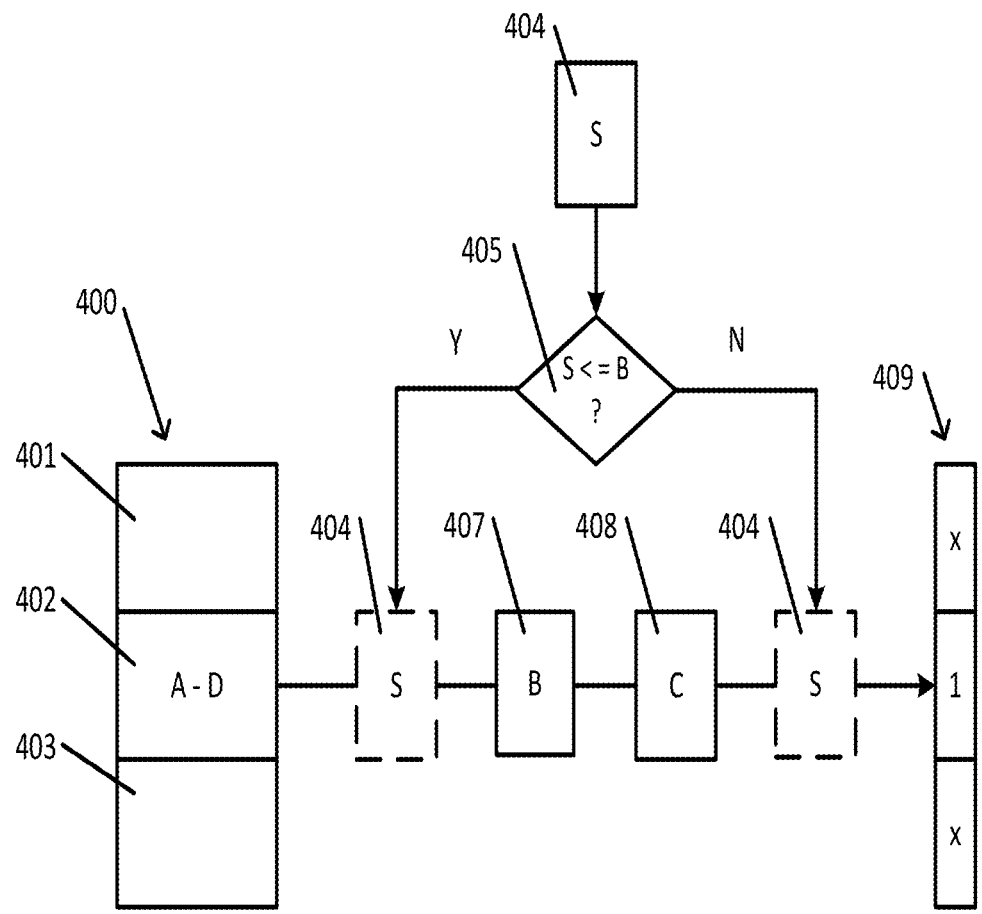
FIG. 4 shows a chunk free operation.

FIG. 4 shows freeing a chunk 404 to bin 402 in bin array 400. Bin 402 has been selected based upon the size, S, of chunk 404, and may be either a small bin, in which case A=D=B=C, or a large bin, in which case A<=B<=C<=D and A<D, assuming the bin is sorted. If S<=B, which is always the case for a small bin, chunk 404 is put at the start of the bin 402 free list ahead of chunk 407; otherwise it is put after chunk 408 at the end of the bin 402 free list and the sort bit for bin 402 is set in the sort bit array 409. Since bins are doubly linked to their free lists, queuing to the front or the back takes the same time and is a fast operation.

Putting freed chunks first has the added advantage of improving cache hits, if a cache is being used. This is because the chunk is likely to still be in the cache if it is reallocated soon after. This effect is less useful for large chunks.

In the following discussion, a bin map (not shown) is mentioned. This is one or more words in which bits represent bins. If a bit is set, the corresponding bin contains a chunk, otherwise the bin is empty. The bin map is used to find occupied bins quickly. Allocation and free operations maintain the bits in the bin map—i.e. a free sets the bit and the last allocation from the bin clears it.

Figure 5A:
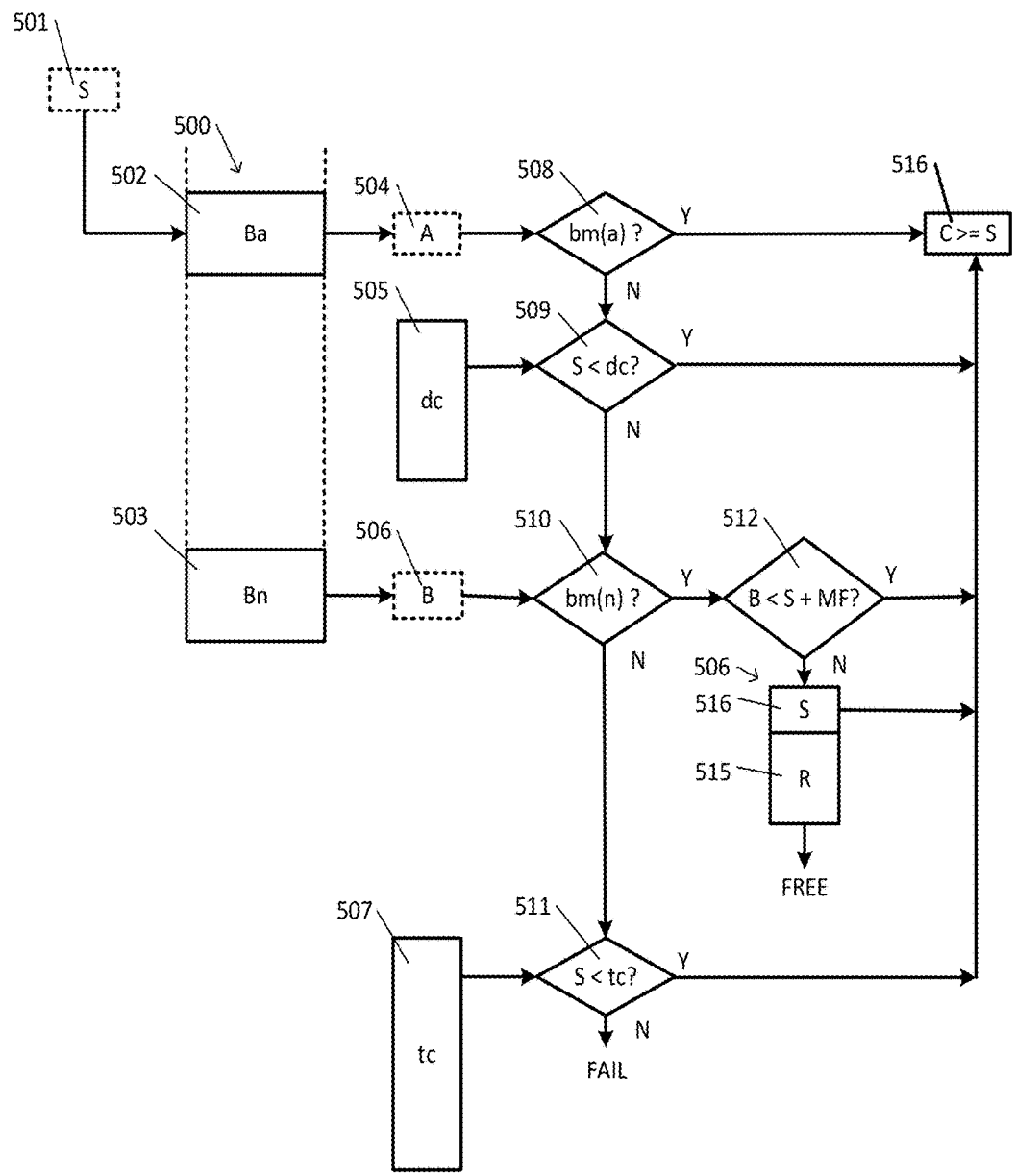
FIG. 5A shows a small chunk allocation

FIG. 5A shows allocating a small chunk 516 for requested size S 501. The SBA 500 is tried first. Bin 502 is selected based upon size 501. Bin map bit bm(a) is tested in 508 to determine if a chunk is present in bin Ba. If so its chunk 504 becomes the allocated chunk 516. Otherwise chunk 516 of size S is calved from donor chunk 505 if it is big enough. If dc is not big enough the bin map is tested in 510 to find the first larger occupied bin 503.

If a larger occupied bin is found, its first chunk 506 is taken and tested in 512 to determine if it is less than S plus MF, where MF represents MIN_FRAG. If it is, chunk 506 becomes the allocated chunk 516. If not, chunk 506 is split into chunk 516 and remnant chunk 515 of size (B−S). Chunk 515 is freed back to the heap bin array as shown in FIG. 4. If a larger occupied bin is not found, the top chunk size is tested in 511 and if it is big enough, chunk 516 is calved from it. If tc is not big enough, the allocation fails. Note that chunk 516 is exactly size S, except in case 506 where a larger chunk is split to form it.

It should be recognized that calving from the donor chunk and the top chunk normally occurs primarily during heap startup when the bins have not been filled. After the heap has been operating for a while, allocations should come primarily from the bins.

Note also that the donor chunk, as shown in FIG. 1A occupies the lower heap memory. If it is large enough to supply all small chunk requests, then all small chunks, except fragments from large chunks, will be in lower heap memory away from large chunks that are in upper heap memory. This can greatly reduce the possibility of allocation failures due to small inuse chunks being caught between larger free chunks, which otherwise could be merged.

Another important dc benefit is "localization". This means that chunks allocated near in time are physically near. Hence, if during initialization a task allocates two or more chunks from dc, these chunks will be adjacent to each other. This is important if the embedded and similar system has a data cache, because it means that the chunks can be co-resident in the data cache, when the task is running, thereby achieving much higher performance. It should be appreciated that heap memory is most likely to be in external DRAM due to small on-chip SRAM in embedded and similar systems, and external DRAM is at least an order of magnitude slower than on-chip cache and SRAM. The same localization occurs for large chunks calved from tc. However, being large they probably cannot be co-resident in the typical small data caches of embedded and similar systems.

Figure 5B:
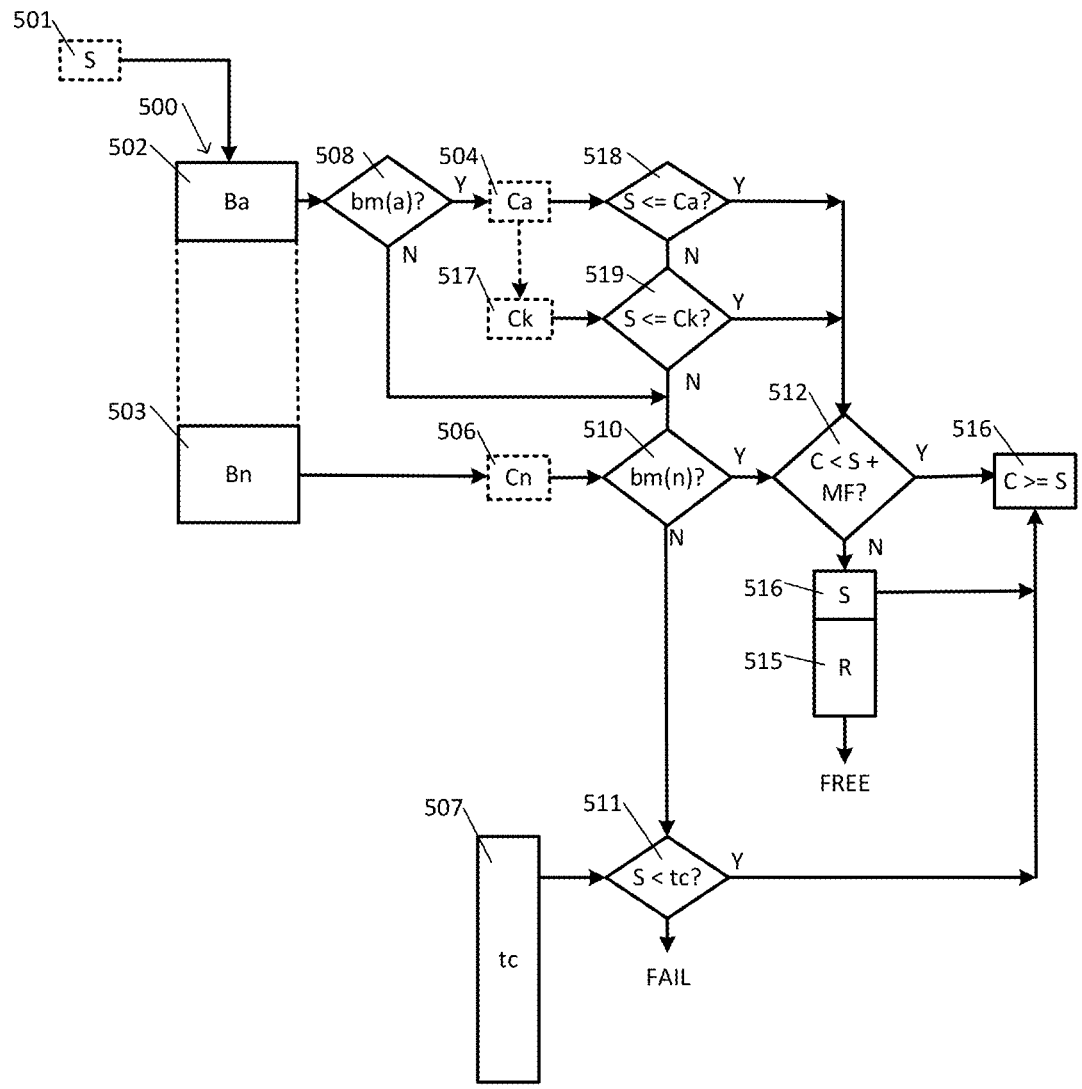
FIG. 5B shows a large chunk allocation.

Large chunk allocation is similar to small chunk allocation with a few differences. FIG. 5B shows allocating a large chunk 516 of size S 501. The UBA 500 bin 502 is selected based upon size 501, as shown in FIG. 3A. The bin map bit bm(a) is tested in 508 to determine if a chunk is present in bin 502. If so, the first chunk 504 is tested to see if it is big enough. Bin 502 could be a small bin or a large bin. If it is a small bin, then chunk 504 will pass test 518 and be taken; if bin 502 is a large bin then chunk 504 may pass test 518 and be taken. If it fails, a search of bin 502 ensues for a large enough chunk. If such a chunk 517 is found, it is taken.

If bin 502 does not have a large enough chunk, the bin map is tested in 510 to find the first larger occupied bin 503. If 503 is a small bin, its first chunk 506 is taken. A C chunk found by any of the methods discussed to this point is tested in 512 to determine if it is less than S plus MF, which is discussed below. If it is, it becomes the allocated chunk 516. If not, it is split into chunk 516 and remnant chunk 515 of size (C−S), which is freed back to the heap as shown in FIG. 3A.

If there is no larger occupied bin, the top chunk 507 size is tested in 511 and if it is big enough, chunk 516 is calved from it. In this case chunk 516 is exactly size S, otherwise it may be larger than requested. If tc is not big enough, the allocation fails.

MF in 512 represents MIN_FRAG meaning minimum fragment. MIN_FRAG is a configuration constant set by the programmer. It governs the minimum fragment that can be split from a larger chunk. This is an important optimization tool to govern fragmentation and performance in embedded and similar systems. If, for example, MIN_FRAG is set equal to the first UBA bin size, then no small chunks will appear in upper heap memory, unless dc has been exhausted. The larger MIN_FRAG, the less chunk splitting that will occur, and the average allocation time will be correspondingly faster. If merging is enabled, the average free time will also be correspondingly faster, due to not merging fragments back into chunks being freed.

MIN_FRAG gives the programmer the ability to trade "internal fragmentation" (i.e. wasted space in allocated blocks) for safety from heap failure and for better heap performance. Internal fragmentation may not be a problem if chunks are frequently allocated and freed and also if bins are kept full so that the need to allocate from larger bins is small.

Merge Control

FIGS. 3A and 3B show the difference in bin populations for the same sequence of free operations with merging enabled in 3A vs. merging disabled in 3B. When physically adjacent chunks such as 209 and 210 in FIG. 2B are merged, the result is a larger chunk 209 in FIG. 2A and this larger chunk is put into the larger bin 337 in FIG. 3A instead of into bins 334 and 335 in FIG. 3B. Additionally, comparing FIGS. 2A and 2B shows that chunks 208 and 212 have been merged back into dc and tc in FIG. 2A. Consequently, these chunks are also not present in the bins in FIG. 3A.

It obviously is not conducive to best performance if the embedded and similar application needs 56- and 72-byte chunks and not 128-byte chunks. Additionally, dequeuing the 56-byte chunk 309, assuming it was already in bin 334, and merging it with chunk 310 requires additional time during the free( ) operation. This is wasted time if a subsequent malloc( ) operation gets the 128-byte chunk 309, splits it into 56 and 72-byte chunks to get one of the sizes, then requeues the remnant. Unlike general-purpose systems, which use a wide variety of chunk sizes while running many different applications, embedded and similar systems tend to use the same chunk sizes over and over. Hence it is desirable to keep the corresponding bins populated.

The downside of disabling free chunk merging is that heap failure may occur when a large chunk cannot be allocated due excessive fragmentation. To avoid this problem, this embodiment of the invention provides automatic control of merging by turning merging ON when free space gets too low and OFF when there is adequate free space in the heap memory. The limits for doing this are controlled by the programmer. Other embodiments may use other heap measures, such as bin populations, number of free chunks, etc. to control merging or may run with merging permanently ON, as do most general-purpose heaps.

In addition, as previously pointed out, the optional donor chunk can be used to segregate small chunks from large chunks, thus reducing large chunk merges being blocked by small inuse chunks between them. This segregation can be further enhanced by using a large MIN_FRAG to prevent small remnant chunks being mixed with large chunks.

This embodiment also includes an optional heap recovery service to find and merge unmerged free chunks in order to create a large enough chunk to satisfy a failed allocation. This service proceeds incrementally through the heap so that higher-priority tasks can preempt and not miss their deadlines while the impacted task is held waiting until its allocation will succeed.

Large Bin Sorting

Figure 6:
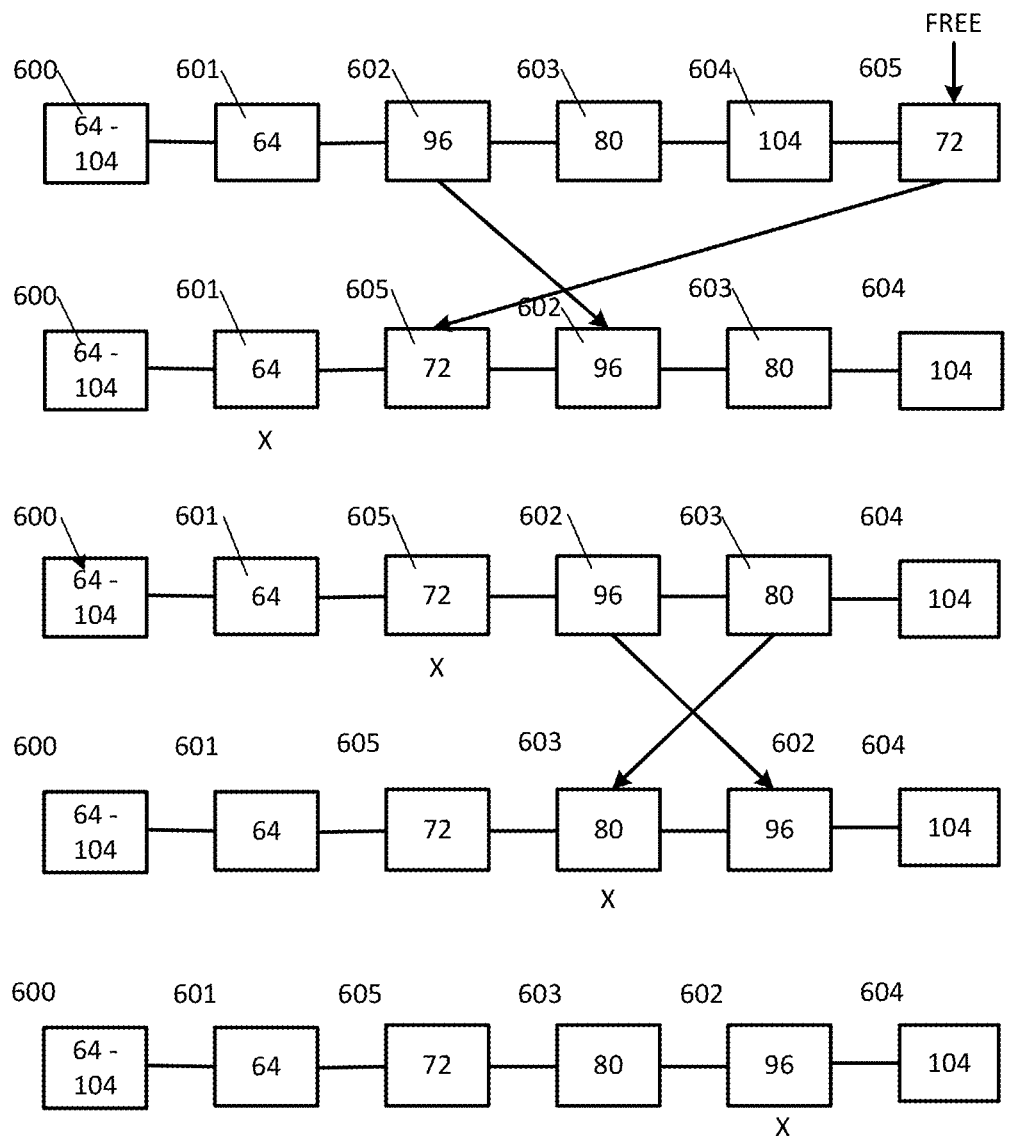
FIG. 6 shows a large bin sort.

FIG. 6 shows sorting large bin 600 containing a 5-chunk unsorted free bin list. A free operation has just put chunk 605 at the end of the bin 600 free list because 605 is larger than the first chunk 601. Chunk 605 is called the "last turtle" because it is the last chunk that could be smaller than a chunk ahead of it, and it would move forward very slowly in a bubble sort. The current chunk for each step is marked with an X. Bin free lists are doubly-linked lists, so "moving" chunks is easily done. (As previously discussed, chunks do not actually move, only links are changed.)

On step 1, it is observed that the last chunk 605 is less than the next chunk 602, so 605 is moved ahead of 602. This is called last turtle insertion. Chunk 104 becomes the new last turtle.

On step 2 X moves back (i.e. toward the end) and it is observed that 605 is less than the last turtle 604 and also less than the next chunk 602, so nothing is done. On step 3 X moves back and it is observed that chunk 602 is less than the last turtle 604 but greater than the next chunk 603, so 603 and 602 are swapped. This is a bubble swap. On step 4 X moves back and it is observed that chunk 602 is less than chunk 604, so nothing is done. This is the end of the first pass. Since a bubble swap occurred, another pass is necessary to verify that the free list is sorted.

Due to the way the free operation puts a larger chunk last, a last turtle insertion would normally be sufficient to sort the bin free list and only one pass would be necessary, since no bubble swaps occurred. If bins are sorted frequently enough this should be the normal case. Badly unsorted bins should be rare.

Large bin sorting is normally done during idle time, when there is no important work to do. Embedded and similar systems have significant idle time in order to dependably handle peak loads and to allow for future expansion of capabilities.

Sort operations must not be interrupted since bin free lists may be damaged. However, multi-pass sorts of long free lists take may take too long thus causing higher priority tasks to miss their deadlines. Therefore, bin sorting must be done incrementally—a few chunks at a time, called a run. Run length is controlled by the programmer. If large bins are not being sorted well enough, then run length can be increased. If tasks are missing deadlines run length can be reduced. Additionally, sorting may be done from a higher priority task with longer runs, if bins get badly sorted.

If a large bin is not well sorted, the worst that may happen is that more chunks must be tested to find a big-enough chunk and the chunk picked might be larger than a big-enough chunk located later in the bin free list. Neither of these is likely to cause serious harm, unless they occur too frequently. In that case the bin configuration can be changed so a bin covers fewer sizes, its size is the same as a frequently used chunk size, or the bin is made a small bin, so no searching is required. This what is meant by heap tuning.

Between sort runs, if a preempting free operation puts a chunk into the bin list being sorted or an allocation operation removes a chunk from it, the sort is restarted. This prevents possible damage to the bin free list and to the system. Since previously accomplished sorting is not lost, restarting a sort has very little impact upon sort time.

Debug Support

Figure 7:
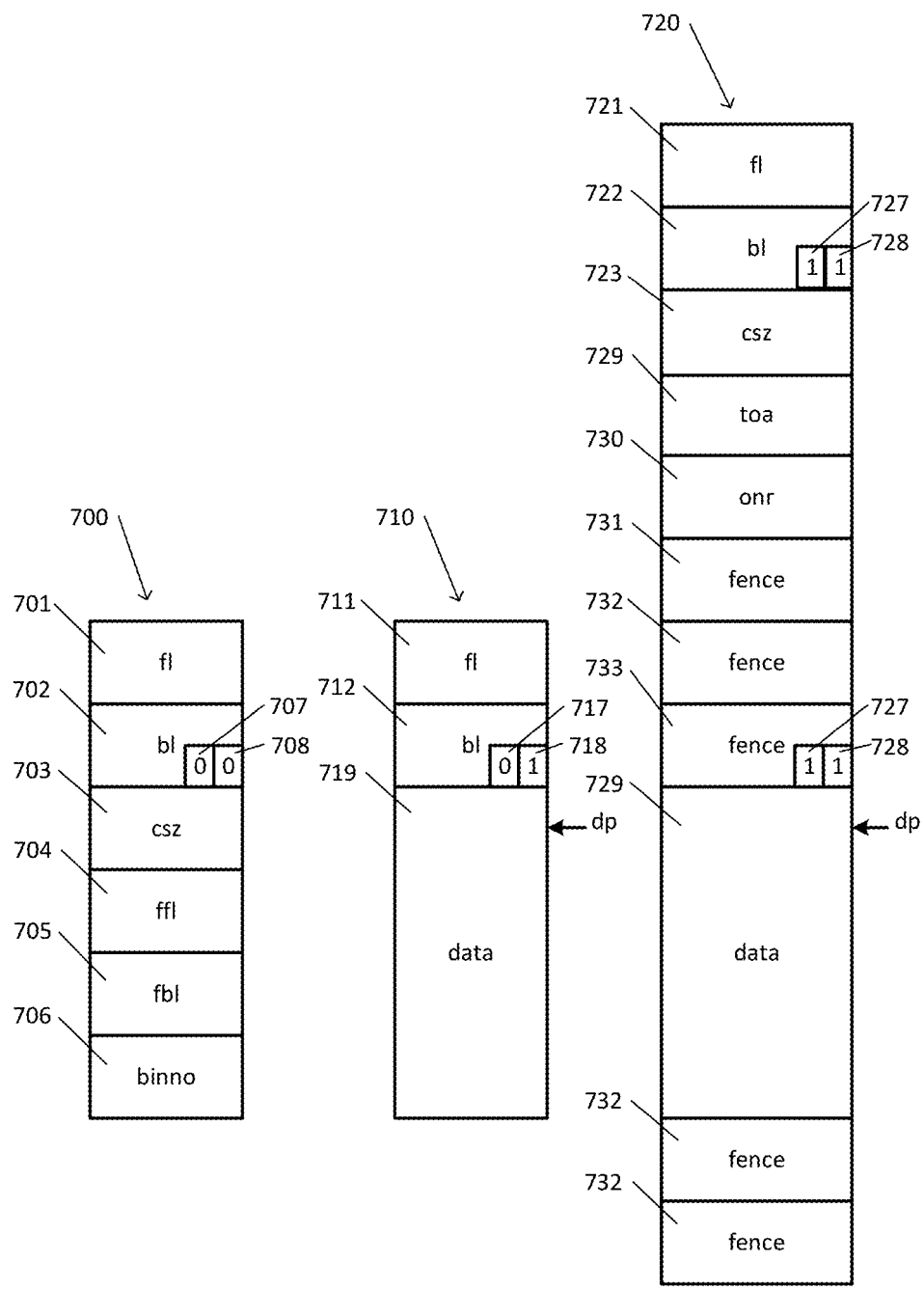
FIG. 7 compares the three chunk types: free, inuse, and debug.

FIG. 7 compares the three types of chunks that occur in the heap: free, inuse, and debug. An important aspect of this invention is that these chunks may be freely mixed in the heap memory.

The free chunk 700 has 8 fields. forward link 701 and backward link 702 are its physical links in heap memory. fl 701 points to the next chunk; bl 702 points to the previous chunk. csz 703 is the chunk size. free forward link 704 and free backward link 705 link the chunk into a bin. ffl 704 points to the next chunk in the bin or is 0 if none. fbl 705 points to the previous chunk in the bin or is 0 if none. Each bin has matching ffl and fbl links. binno 706 is the bin number of the bin the chunk is in. Since all chunks are on 8-byte boundaries, the lower 3 bits of links must be 0 and thus are not needed for addresses, making them available for other purposes. Bit 0 of bl is the inuse flag 708, shown as 0; bit 1 of bl is the debug flag 707, shown as 0. These flags determine the chunk type.

The inuse chunk 710 has 5 fields. fl 711 and bl 712 link it into heap memory like the free chunk. The data field 719 is the data block that has been allocated to an application program. dp is the data pointer returned to the application to access the data. Notice that the last 4 fields of the free chunk have been overwritten with data, since they are no longer needed. This is the smallest supported chunk size of 24 bytes; it supports a 16-byte data block. The inuse flag 718 is set to 1; the debug flag 717 is set to 0.

The debug chunk 720 has 11 fields plus the number of additional fences 732 specified by the programmer. fl 721 and bl 722 are the same as the other chunks. csz 723 is the same as the free chunk 703. New fields are: time of allocation to a 729, owner onr 730, first fence 731, and extra fences 732 and 733. The data field 729 is the same as the inuse chunk 719, and dp is the pointer returned to it. From the application's perspective inuse and debug chunks are indistinguishable.

The inuse and debug flags, which are both set to 1 in bl 722, are mirrored in fence 733. This is because the free operation passes back only dp, and the heap manager must determine the chunk type from the flags in order to determine its starting address. As shown in this example, the starting address is dp-8 for an inuse chunk, but it is dp-32 for a debug chunk. Fence 733 represents either the first fence, if there are no extra fences; otherwise it represents the extra fence above the data block 729.

Fences consist of a recognizable pattern such as 0xAAAAAAAA except fence 733 which would be 0xAAAAAAAB, in this case. Fences serve to allow a system to continue running when data blocks overflow. They also provide a known pattern against which a programmer can see overflows in a debugger memory window or which can be tested against to detect overflows in an operating system. The scan function, described below, tests for broken fences in debug chunks. To be effective, 10 or more fences above and below a data block may be necessary. This number is controlled by the programmer.

As shown in this embodiment with four extra fences, a debug chunk adds 40 bytes overhead vs 8 bytes for an inuse chunk. With 10 extra fences above and below the data block, it would add 104 bytes of overhead. Due to the limited memory in most embedded and similar systems, it generally would not be possible for all allocated chunks to have so much overhead. Debug mode provides a solution for this. When debug mode is ON, debug chunks are allocated. When debug mode is OFF, inuse chunks are allocated. This allows a programmer to use debug chunks for code that is being debugged, while using inuse chunks for code that has already been debugged.

Memory leaks can be found by scanning time 729 and owner 730 fields in debug chunks. In the first case, chunks older than a certain time may be suspect. In the second case, chunks owned by deleted or stopped tasks are suspect. For this type of sleuthing, fences around the data block would probably be eliminated so that debug chunk overhead would be 16 bytes more rather than 88 bytes more than an inuse chunk as in the example above. Then the net can be cast wider to cover more suspected chunks.

It often is necessary to look directly at heap memory via a debugger memory window in order to determine what is wrong. An additional debug aid is chunk fill patterns, which make this task much more pleasant and productive. During fill mode, distinctive patterns are loaded into data blocks of inuse chunks when allocated and empty areas of debug chunks when freed. These fill patterns help greatly in understanding the heap image presented in a memory window. Old chunk headers are overwritten with the above patterns, so it is clear which chunk headers are actually in use and where chunks actually begin and end. In addition, it is helpful to see what memory is in use and what memory is free.

Fill mode may be selectively turned ON or OFF, like debug mode. This is beneficial because filling chunks greatly reduces the performance of malloc( ) and free( ). Therefore, it is possible to enable filling only chunks of interest. Such chunks are not likely to be in the same heap area. Filling them helps them to stand out against the background of chunks not of interest. In addition, knowing what kind of header to expect helps to find and interpret it.

The debug aids above are especially helpful when debugging third party software with which the programmer has no familiarity. This kind of software, often called SOUP (Software of Unknown Pedigree), may have problems with block overflows and memory leaks. Turning on debug mode and scan mode for such software, coupled with heap scanning discussed next can help to find otherwise elusive bugs.

Self-Healing

Self-healing is implemented in this embodiment by heap and bin free list scanning. Other embodiments may not use these optional services.

It assumed that only one word can be damaged at a time and that a heap has hundreds to thousands of chunks and that millions of normal heap operations will occur between events that damage the heap. Hence, the odds are good that there is sufficient time to fix the heap before a malloc or free operation pointer or another damaged chunk field is used. This extra protection can be vital in order for unattended systems in harsh environments to run reliably.

Figure 8A:
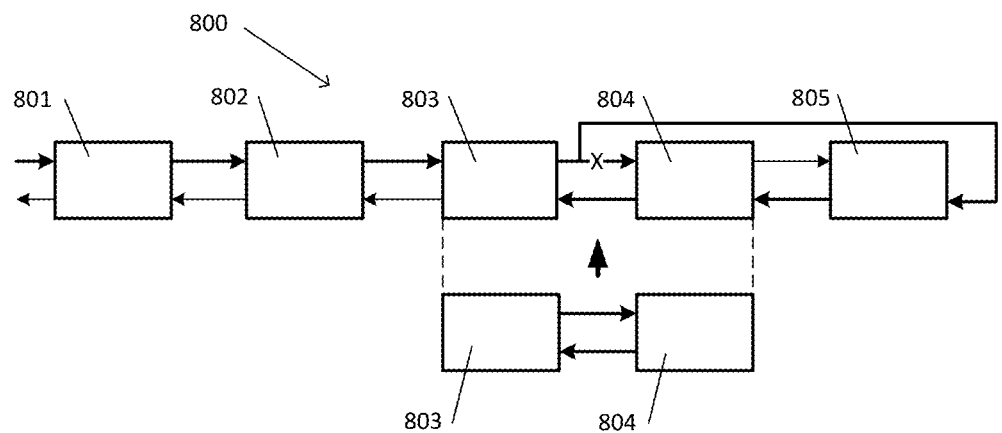
FIG. 8A shows heap or bin free list scan and fix.

FIG. 8A shows a heap or bin scan and fix. 800 can be either chunks linked in heap memory or chunks linked in a bin free list. This figure shows part of a scan near the end of the heap or a bin free list. Forward links, fl's, go to the right; backward links, bl's, go to the left. Starting at chunk 801 its fl should point to chunk 802 and 802 bl should point to chunk 801. This is true so the scan moves forward to chunk 802 and the check is repeated with chunk 803. This is also true so the scan moves to chunk 803. Here the test fails. At this point either 803 fl is broken or 804 bl is broken.

If chunk 803 is a free or debug chunk, the chunk size is used to locate chunk 804 and to fix whichever link is broken. But for an inuse chunk, it is necessary to go to the last chunk 805 in the heap memory or bin free list and to trace backward until chunk 804 is reached. Assuming that only one link can be broken at a time, if chunk 804 bl points to 803, then 803 fl is broken; if 803 fl points to 804 then 804 bl is broken. Either way the broken link can be fixed, as illustrated underneath, and the scan continues.

As well as fixing broken links, heap scans also fix flags, sizes, and fences, as they go. In a debug version, the scan stops on a broken fence so that the fence can be examined for clues to what happened. In a release version, the fence is fixed. Fixes are reported and saved in the event buffer for later system analysis.

The heap and bin scan services are intended to be run during idle time so that they will not consume valuable processing time. As discussed under bin sorting, real-time systems must have significant idle time in order to handle peak asynchronous events and to be expandable for future requirements. As with bin sorting, it is also necessary that scanning be incremental, thus requiring many runs to scan the full heap or a large bin free list. Run lengths are generally small for forward scans, but large for backward scans since fixing a known break is of high priority. A scan pointer points to the starting chunk for the next scan. If a free operation merges this chunk the scan pointer is changed to point to the merged chunk.

Figure 8B:
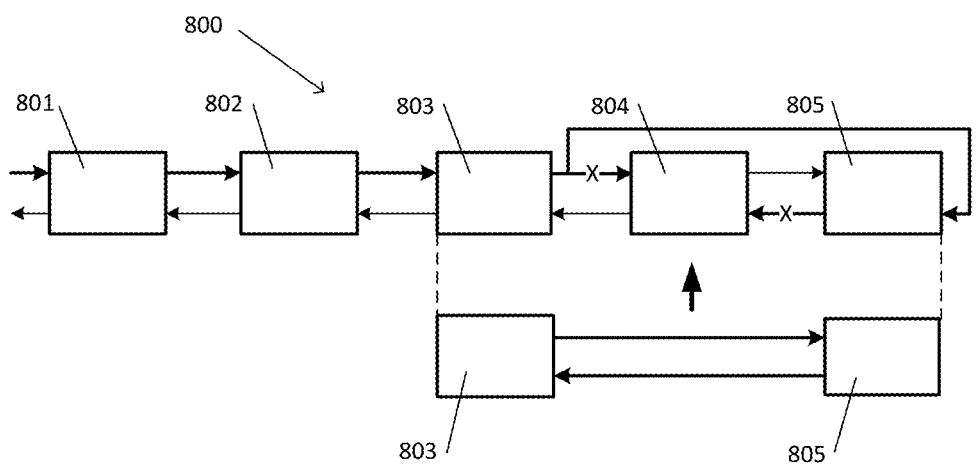
FIG. 8B shows heap or bin free list scan and bridge.

FIG. 8B shows the case where both a forward link and a backward link are broken. The previous process is repeated, but due to a broken 805 bl, it is not possible to reach chunk 804. Thus, a bridge is formed, as shown, from chunk 803 to 805. This allows the heap to continue operating, at least for a while. In the case of the heap, itself, if chunk 804 is inuse and continues inuse, there will be no problem. In the case of a bin, chunk 804 will not be allocated. Either way, a free is likely to encounter a broken link and fail after reporting the error. In that case, it may be necessary to reboot the system in order to continue safe operation.

Heap scanning normally runs as a slow, steady patrol looking for trouble and fixing what it can. For example, at one run per tick, 2 chunks per run, and a heap of 100,000 chunks, 50,000 ticks would be required to complete a scan. At 100 ticks/sec this is 500 seconds or 8⅓ minutes per scan. Bin scanning is similar but takes less time. Together they should provide adequate heap protection even in the harsh environments faced by many embedded and similar systems.

SUMMARY

It should be appreciated that the foregoing is but one embodiment of this invention chosen here to present a clear description of all of the features of the invention. However, the invention presents a large number of embodiments to the embedded and similar system programmer thus enabling him to customize the heap to his requirements and to omit features he does not need. In addition, this embodiment provides debug and self-healing features, which the programmer may choose whether to use.

The invention claimed is:

1. A method to easily optimize a heap for an individual embedded or similar system in order to achieve best performance and reliability, comprising:
    a computer read/write memory to store said heap, which consists of chunks that are linked together, wherein each chunk consists of a chunk control block to control the heap and an inuse data block being used by said application software or a free data block available to be allocated to said application software;
    an additional computer read/write memory to contain a heap bin array, which consists of a plurality of bins, wherein a bin of said bin array is a free list header for a linked list of free chunks, comprising a bin queue, each said bin handles a different range of consecutive chunk sizes, said bins are ordered in said bin array by increasing chunk sizes, and other control information necessary to manage said heap;
    additional computer read/write or read-only memory containing a heap bin size array, heap management software, and said application software that uses said heap;
    one or more processors connected to all three memories and programmed for:
    initializing said heap to have a start chunk, an optional donor chunk, a top chunk and an end chunk;
    controlling said heap chunk allocations and chunk frees with said bin array composed of a plurality of bins of various sizes wherein said bin array and sizes of said bins are controlled by said bin size array, which is an array of increasing bin sizes that are multiples of a power of two, such as 8, wherein a bin size at a relative position in said bin size array is smallest chunk size for a bin at the same relative position in said bin array;

accepting allocation commands from said application software, obtaining chunks of required sizes from said bins, said donor chunk, or said top chunk and returning data block pointers to data blocks in said chunks;

accepting free commands using said data block pointers from said application software to put the chunk containing said block into a bin wherein its size is less than or equal to said chunk size and said chunk size is less than the size of the next bin in said bin array, except that said top bin has no upper size limit and thus no next bin comparison is performed for it;

accepting other commands from said application software to perform heap services for sorting bin queues, scanning said heap, scanning said bin queues, repairing said heap, repairing said bin queues, accessing said heap variables, setting said heap variables, and extending said heap;

performing heap management operations to improve said heap performance and reliability.

2. The method of claim 1, wherein said bin size array starts with a predetermined smallest chunk size followed by increasing chunk sizes and ending with a distinctive end marker, and a small bin contains one chunk size, a large bin contains chunk sizes ranging from its bin size up to one chunk size less than the next larger bin size, and a top bin contains all chunk sizes from its bin size up, and the number of bins can be as little as one up to any number, and bins can be added, removed, or resized as needed, merely by making changes to said bin size array and recompiling said application code, whereby a programmer is enabled to match bin sizes to requested block sizes in said application software.

3. The method of claim 2, wherein a small-bin array can be formed by consecutive small bin sizes at the start of said bin size array, said a small-bin array consists only of small bins, a bin in said small-bin array can be selected by a calculation based upon the chunk size required by an allocation, and said small-bin array can contain any number bins, including no bins, as needed to allocate small chunks in a system, as they are requested by said application software, whereby a programmer is enabled to adjust the size of said small-bin array from none to many in order to meet the needs of said application software for small blocks.

4. The method of claim 3 wherein allocation of said small chunk is achieved by allocation from said optional donor chunk when said selected small-bin array bin is empty whereby this results in faster small chunk allocations than if made from larger bins and also results in small chunks being located in lower heap memory where said donor chunk is located.

5. The method of claim 2, wherein an upper bin array is formed starting with the first gap of two or more bin sizes in said bin size array, said upper bin array can consist of any mixture of small and large bins, a bin in said upper bin array can be selected via a search, such as a binary search, of the required chunk size versus said bin size array, said upper bin array bin sizes can be adjusted to optimize performance, and said upper bin array can contain any number of bins, including only said top bin, whereby a programmer is enabled adjust said upper bin sizes to favor chunk sizes that are often requested by said application software, thereby improving performance.

6. The method of claim 5, wherein large bin allocations benefit from a combination of allocating the first chunk in a large-bin queue that is greater than or equal to the chunk size required for the allocation, placing a freed chunk that is smaller than the first chunk in a large-bin queue at the start of said large-bin queue, otherwise placing it at the end of said large-bin queue, and last-turtle-insertion sorting that moves the last chunk in a large-bin queue ahead of the first larger chunk in said large-bin queue, whereby a best-fit, large-chunk allocation is often achieved with no searching and one-pass sorting is also often achieved.

7. The method of claim 6, wherein said large-bin queue sorting is performed incrementally in a low-priority task, such as an idle task, so that higher priority tasks can preempt in order to not miss their deadlines, and bubble sorting is included to speed up sorting and to detect when said sorting is done, whereby there is little or no system performance lost due to large-bin queue sorting because said embedded or similar systems have significant idle times in order to guarantee that real-time loads can be met without missing deadlines.

8. The method of claim 6, wherein choosing large bin sizes equal to frequently-used large-chunk sizes eliminates large bin searches for said sizes because their allocations take said first chunks in said large-bin queues.

9. The method of claim 6, wherein choosing small bins for frequently-used large-chunk sizes eliminates both bin searches and bin sorts for said large-chunk sizes, and also moves of larger chunks that follow them to the next higher bin where said larger chunks will be closer to the start of said higher bin queue, thus requiring less searching for them.

10. The method of claim 2, wherein free chunk merging can be turned off to maintain bin populations so that more allocations come from bins matching requested chunk sizes and so that frees do not require merging freed chunks with adjacent free chunks; merging can be automatically turned off and on to improve performance without excessive fragmentation by monitoring the amount of free heap space available versus a predetermined free space setting or performing other heap measures.

11. The method of claim 2, wherein a recovery service incrementally searches heap memory to find and merge adjacent free chunks in order to satisfy a missed allocation, whereby this service avoids allocation failures due to heap fragmentation and can be preempted by higher-priority tasks, both of which are important for reliable operation of embedded and similar systems.

12. The method of claim 2, wherein bins may be seeded by dividing larger free chunks into smaller free chunks for said bins thus providing another way to initially populate said bins and to maintain said bin chunk populations during operation, whereby startup time is a concern for many embedded and similar systems and keeping bins populated produces more consistent operation of said systems.

13. The method of claim 1, wherein a predetermined minimum fragment size determines the minimum size chunk that may result from slitting of an over-size allocated chunk, can be increased in order to reduce the frequency of said allocated chunk splitting, whereby not splitting said allocated chunks speeds up chunk allocations and reduces subsequent chunk merging, which speeds up chunk frees.

14. The method of claim 13, wherein fragmentation is reduced by locating said donor chunk, which is the source of most small chunks, in lower heap memory and locating said top chunk, the source of all large chunks, in upper heap memory, and setting said predetermined minimum fragment size to be larger than any said small chunks in order to keep said small chunks out of said upper heap memory, and the segregation produced by the combination of these methods reduces fragmentation due to free chunk mergers being blocked by inuse said small chunks that are between said free large chunks, whereby heap failure due to fragmentation is thus reduced leading to more reliable operation, which is important for embedded and similar systems, that are often expected to run for years with no operator supervision.

15. The method of claim 2, wherein debug mode on causes debug chunks to be allocated and debug mode off causes inuse chunks to be allocated, said debug chunks can be freely mixed with said inuse and said free chunks in heap memory, thus allowing debug chunks to be used selectively only in code being debugged so that limited heap memory is not exceeded due to the larger size of debug chunks than of inuse chunks.

16. The method of claim 15, wherein said debug chunks contain debug information such as when said debug chunk was allocated and by what task, and which surround said debug chunks' data blocks with fences consisting of known data patterns to enable detecting data block overflows and to allow operation to continue by containing overflow damage so it does not affect said or adjacent chunk control block fields, whereby these features of debug chunks enable a programmer to find common heap problems such as data block overflows and memory leaks.

17. The method of claim 1, wherein a heap fill mode can be turned on to selectively fill chunks with distinct patterns for each of free chunks, inuse chunks, debug chunks, application-specific chunks, said donor chunk, and said top chunk, then off to minimize performance impact for the rest of the system; when combined with forward and backward links in each chunk makes heap viewing easier; and filling over dead links in merged chunks avoids confusion, whereby a programmer can see what is happening in the heap for a portion of said application code that is under test, thus helping him to find and fix problems.

18. The method of claim 1, wherein self-healing is achieved by heap and bin free list scan functions that make use of forward and backward links available in all chunks to scan said heap and said bin free lists forward to find and report breaks and backward in order to fix breaks; where forward scans are performed incrementally a few chunks per run in order to avoid excessive delay of higher priority operations, whereas backward scans are performed many chunks per run in order to fix breaks quickly; and other errors found in chunk control block fields are also reported and fixed, if possible, whereby self-healing helps embedded and similar systems, which are installed in harsh environments to run error-free for years.

19. The method of claim 18, wherein continuous scanning of debug chunk fences is performed while a system is running in order to detect data block overflows in a timely manner in order to aid debugging, and for released systems to report data block overflows then fix fences and continue running, whereby this reduces debugging time and improves embedded or similar system reliability.

20. The method of claim 18, wherein, if the said break cannot be reached while scanning backward, a bridge is formed from the chunk with said broken forward link to the chunk with said broken backward link by linking said chunks, so that although some bridged-over chunks may be lost, the system can continue to run in a reduced mode, whereby continuing to run until help arrives may avert property damage and personal injury for embedded and similar systems that perform control functions.

* * * * *